Dec. 24, 1929.     A. SCHMIDT     1,740,524
PIPE BEND
Filed April 10, 1924
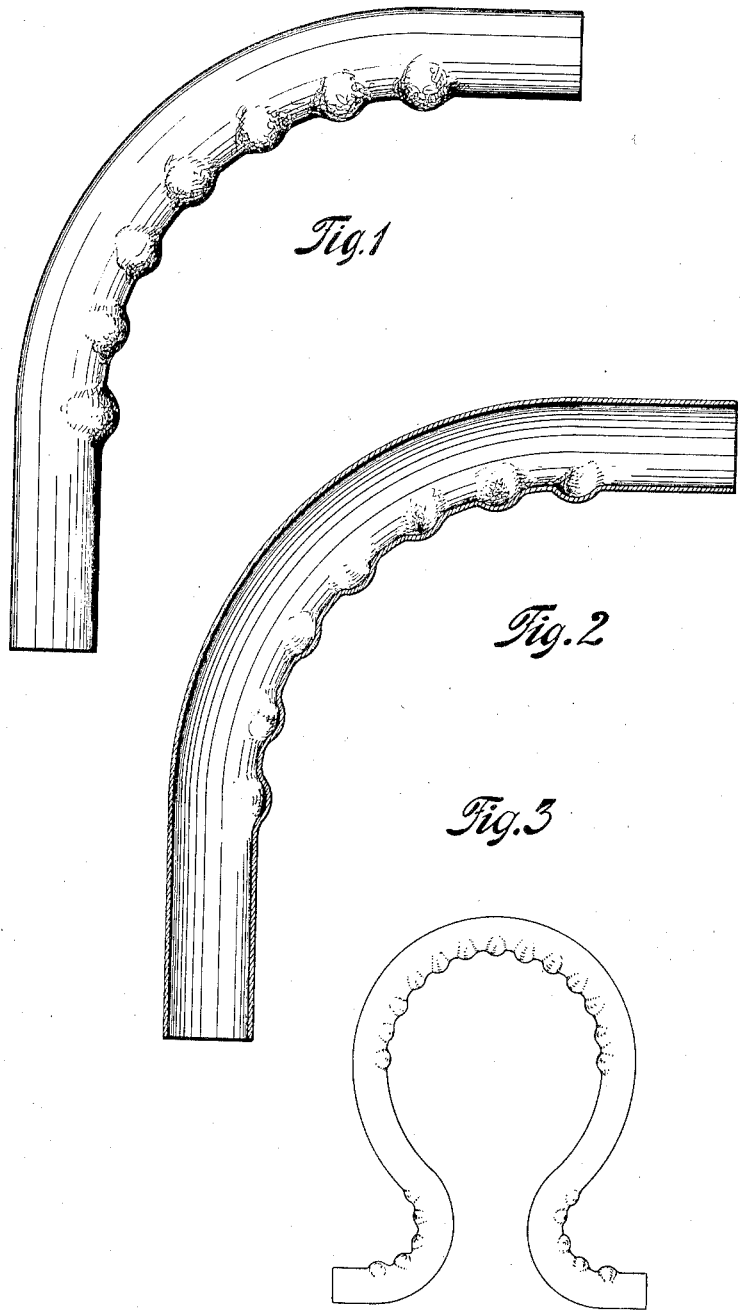
Inventor:
Alfred Schmidt
by
Marks & Clerk
Attys.

Patented Dec. 24, 1929

1,740,524

UNITED STATES PATENT OFFICE

ALFRED SCHMIDT, OF DUSSELDORF, GERMANY

PIPE BEND

Application filed April 10, 1924, Serial No. 705,658, and in Germany June 6, 1923.

In steam piping, more particularly in the case of pipe lines for conveying superheated steam of high temperature, corrugated pipes are used for taking up the longitudinal expansion at the bends, as they give more readily than smooth bent steam piping. So-called expansion loops made of corrugated piping are also introduced into straight runs of piping. Such corrugated pipes are made by heating and cooling alternate zones of the pipe, the pipe being compressed axially. In order to eliminate the strains in the material due to the alternate heating and cooling, the finished pipe is finally annealed in the annealing furnace.

The ordinary corrugated pipes have various disadvantages, owing to the fact that the corrugations pass right round them. Owing to their great surface, the heat radiation is relatively great and eddies are formed by the corrugations in the flow of steam, which may cause considerable pressure losses when the velocity of the steam is great.

It has also been proposed to form copper steam pipe bends having indentations on the inner side of the bend. In this case the cross-sectional area of the pipe at the bend is less than that of the straight portion of the pipe.

According to the present invention these draw-backs are as far as possible eliminated by the pipe, instead of being provided with corrugations passing completely round it, being provided with bulges on the inner side of the bend only, said bulges extending outwardly beyond the normal periphery of the pipe.

In the accompanying drawing,

Fig. 1 shows a side view of a pipe bend,

Fig. 2 the same bend in section and

Fig. 3 an expansion loop.

The pipes according to the invention are made by filling a steam pipe (patent-welded, seamless or the like) with sand and thereupon bending it in a cold or hot state, the place at which the crease is to be formed being specially heated by means of a welding burner or the like. Owing to the pipe being filled with sand, the place thus heated will bulge outwards. In this manner one crease after another is formed, the first crease, the third crease and so on being preferably first formed and the intermediate creases subsequently.

In these bends the creases lie only along the inner side of the bend and banish in the neighbourhood of the neutral axis, leaving the outer part of the bend free. Where the pipe is no longer bent, but straight, there are no creases. Hence the radiation surface is considerably smaller than is the case in corrugated pipes. One great advantage is that eddying in the flow of steam is very greatly reduced. Owing to centrifugal force the steam has the tendency to slide along the outer curve of the bend, which is smooth in pipes made according to the present invention. The material is less stressed in the process of manufacture than is the case in corrugated pipes, as there is no alternate heating and simultaneous cooling of adjacent zones and no axial compression of the material. Hence, the durability is greater than in the case of corrugated pipes, while the cost of manufacture is less. The resilience is at least as great as in the case of corrugated pipes. The durability is greater than is the case with smooth bends, as the wall of the bend is not extended at the outer periphery and is therefore not weakened, the material being compressed on the inner side of the bend and taken up by the creases.

It is important that the outer surface of the bend of a bent steam pipe be smooth, and that the corrugations gradually disappear at the middle of the pipe, so that the surface of the outer half of the bend has a smooth surface. In the case of the thin-walled sheet metal pipes, such as are employed as stove pipes, the folds extend beyond the middle of the pipe and nearly encircle it. In the already known bent steam pipes which are produced by bending pipes having circular corrugations, it is true that these corrugations are flattened on the outside of the bend, but not completely, so that in the case of these pipes there are always very uneven places at the outside of the bend. In the case of the bent pipe according to the present invention in which the outside of the bend is entirely smooth, the steam which flows through the pipe with considerable velocity has its direction of motion changed by means of a smooth surface, so that no eddies can be formed in the current of steam, which would produce a considerable loss of pressure.

What I claim is:—

A bent thick walled steam pipe, capable of acting as an expansion-loop, having a smooth surface at the outside of the bend and outwardly extending bulges on the inner side, said bulges extending beyond the normal periphery of the pipe only outwardly and vanishing in the neighborhood of the neutral axis of the bend.

In testimony whereof I have signed my name to this specification.

ALFRED SCHMIDT.